(No Model.)
H. GREGORY.
SHOE FOR CYCLE WHEELS.
No. 492,510. Patented Feb. 28, 1893.
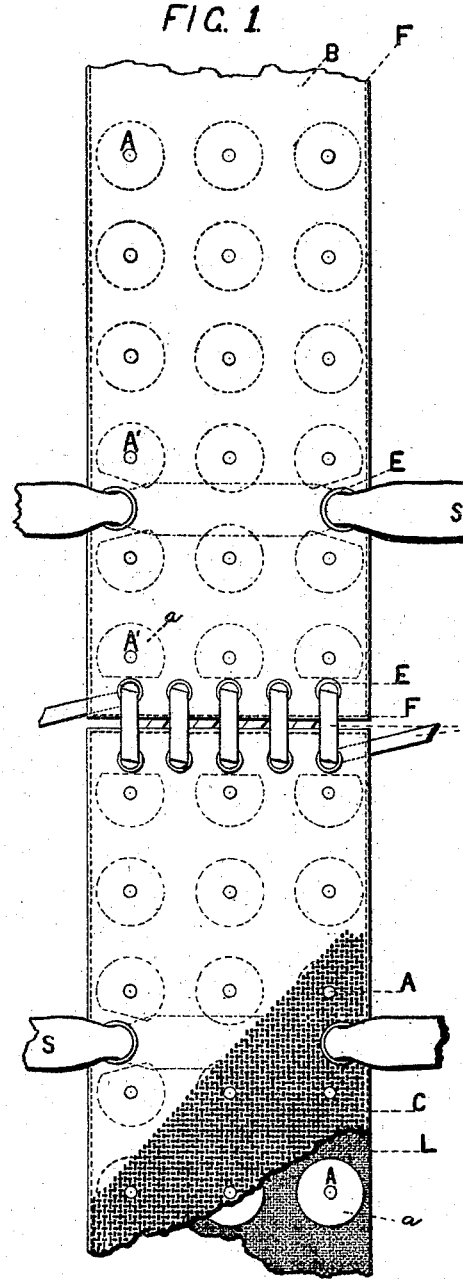
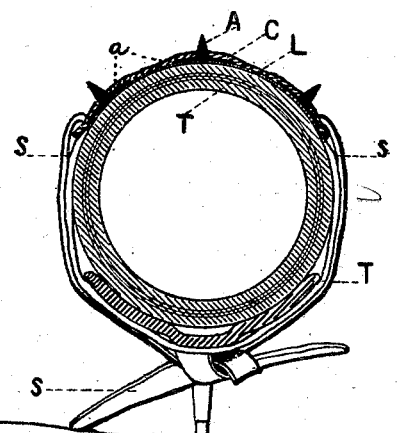
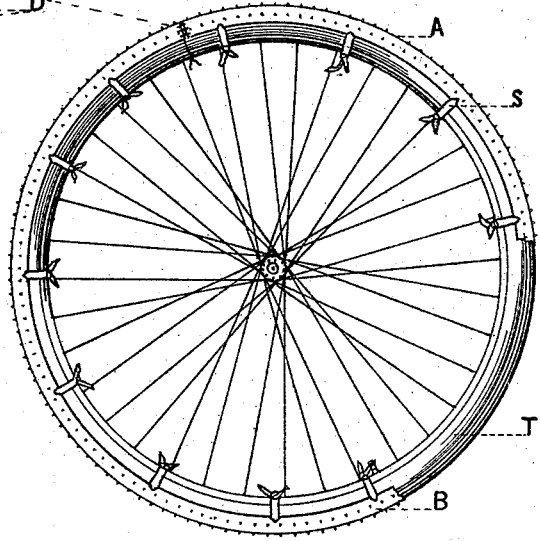
WITNESSES:
Ferdinand W. Gregory
Caroline Armsbee Gregory
INVENTOR
Herbert Gregory
BY John B. Sabine
his ATTORNEY.

UNITED STATES PATENT OFFICE.

HERBERT GREGORY, OF NEW YORK, N. Y.

SHOE FOR CYCLE-WHEELS.

SPECIFICATION forming part of Letters Patent No. 492,510, dated February 28, 1893.

Application filed October 26, 1892. Serial No. 450,006. (No model.)

*To all whom it may concern:*

Be it known that I, HERBERT GREGORY, a citizen of the United States, and a resident of New York, in the county of New York and State of New York, have invented certain new and useful Improvements in Cycle-Traction, of which the following is a specification.

The object of my invention is to provide a covering or shoe for bicycle-tires, for the purpose of better or more perfect traction or to prevent slipping on wet or icy pavements or tracks or on ice.

I attain the object of my invention by means of a strip or belt, composed of two or more layers of strong canvas, rubber cloth, or some similar substance, in which are fastened short spikes, and which is, attached to the tire substantially as illustrated in the accompanying drawings, which are made a part of this specification, and in which—

Figure 1, shows a section of such a belt or strip and means of lacing or fastening it together and to the tire of the wheel. Fig. 2, gives a cross-section view of a bicycle tire, and the spiked shoe, and a means of fastening them together. Fig. 3, gives a view of a bicycle wheel, with a section of such a spiked shoe or belt attached thereto, showing how it may be attached, and its general appearance when in place and ready for use.

Similar letters refer to similar parts throughout.

Again referring to Fig. 1, B. indicates, the completed shoe or belt. A, the short spike with its flat disk or shoulder *a.* to hold it steady. C. and L. represent two thicknesses of canvas fastened together by means of flexible cement (preferably rubber cement) and stitched along the edges as indicated by F. The disk or shoulder *a*, of spike A, is shown as placed between the two layers or thicknesses of the belt with the spike protruding through the outer layer. E. indicates eyelet holes for the lacings. D. indicates a fine lacing, fastening the ends of the belt together, S. a heavier lacing, (preferably of lace leather) by which the shoe or belt is to be fastened to the tire of the wheel. A' shows part of shoulder *a.* cut-away on some of the spikes, to make room for the eyelets.

The cross-section of the tire and shoe shown in Fig. 2. more fully shows the shape and relative position of the different parts to each other, T. indicating a pneumatic tire. A shows more fully the shape of the spike with its shoulder or disk *a.* placed between the layers of the belt, and slightly sprung to conform to the shape of the tire. C, L, the layers of canvas forming the belt. S, the lacing fastening the belt to the tire, and Z, a section of a wheel spoke.

Fig. 3, gives the general appearance of the belt or shoe B. fastened to tire T. by means of straps S, but I do not limit myself to this means of fastening the shoe to the tire, as any well known means or style of lacing that would hold the shoe to the tire may be used without departing from the spirit of my invention.

Now, having described my invention and how to make and use it, what I claim as new, and desire to secure by Letters Patent, is—

1. A belt composed of canvas or similar substance, having short spikes embedded between the layers of said belt, and said belt arranged to be laced to the tire of a wheel, in combination with the tire and felly of a wheel, substantially as and for the purpose set forth.

2. In a flexible ice shoe or belt, arranged to inclose a bicycle tire, the combination of the flexible belt with the short spikes, said spikes embedded between the layers of said belt and arranged to prevent the wheel from slipping all substantially as set forth.

Signed at New York, in the county of New York and State of New York, this 8th day of August, A. D. 1892.

HERBERT GREGORY.

Witnesses:
 FERDINAND W. GREGORY,
 CAROLINE ORMSBEE GREGORY.